(12) United States Patent
Shimooka

(10) Patent No.: US 7,277,909 B2
(45) Date of Patent: Oct. 2, 2007

(54) HIGH SPEED ADDER

(75) Inventor: Masaaki Shimooka, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 588 days.

(21) Appl. No.: 10/695,489

(22) Filed: Oct. 28, 2003

(65) Prior Publication Data

US 2004/0243658 A1 Dec. 2, 2004

(30) Foreign Application Priority Data

Nov. 22, 2002 (JP) ............................. 2002-339707

(51) Int. Cl.
*G06F 7/50* (2006.01)
(52) U.S. Cl. ................................... 708/714
(58) Field of Classification Search ................ 708/710, 708/711, 712, 713, 714
See application file for complete search history.

(56) References Cited

U.S. PATENT DOCUMENTS 5,257,218 A * 10/1993 Poon .......................... 708/712
5,285,406 A * 2/1994 Lynch et al. ................. 708/714
5,631,860 A * 5/1997 Morinaka .................... 708/710
6,134,576 A * 10/2000 Hossain et al. .............. 708/710

OTHER PUBLICATIONS

Kuo-Hsing Cheng, et al. The Improvement of Conditional Sum Adder for Low Power Applications/ 1998 IEEE pp. 131-134.

* cited by examiner

*Primary Examiner*—Chuong D. Ngo
(74) *Attorney, Agent, or Firm*—Katten Muchin Rosenman LLP

(57) ABSTRACT

Provided is an adder composed of (N+1) circuit stages in the ease of $2^N$ bits. In the case of N=4 (that is, 16 bits), provisional carries that indicate the case where carry is produced from a low order bit and the case where no carry is produced therefrom are generated by conditional cells in a first circuit stage. In second to fourth circuit stages, the provisional carries corresponding to higher seven bits other than the most significant bit are converted into provisional sums by converters in a circuit stage in which the provisional carries are transferred. In addition, actual carry signals are selected from the provisional carries corresponding to lower seven bits other than the least significant bit in a circuit stage in which the provisional carries are transferred. In a fifth circuit stage, bit sums for each of the bits are generated and outputted.

16 Claims, 9 Drawing Sheets

HIGH SPEED ADDER

BACKGROUND OF THE INVENTION

1. Field of the Invention

The present invention relates to an adder, and more particularly to an adder that operates at a high speed.

2. Description of the Related Art

In recent years, computers are becoming faster and faster. Therefore, a higher speed arithmetic circuit is required and a technique for increasing an operating speed of an adder serving as an important part thereof becomes important. A large number of techniques for realizing a high speed adder have been known. Of those, a conditional sum adder has been widely known as one of the highest-speed adders.

FIG. 1 is a circuit diagram showing a 4-bit conditional sum adder of a first conventional example described in, particularly, FIG. 6 in Kuo-Hsing Cheng et al., "The improvement of conditional sum adder for low power applications", 1998. IEEE ASIC Conference Proceedings, pp. 131-134. As shown in FIG. 1, in the first conventional example, when a binary number (A_3), A_2, A_1, A_0) is added to a binary number (B_3, B_2, B_1, B_0), each of conditional cells 111 in a first circuit stage 21 generates both provisional bit sum signals and provisional carry signals and outputs them. Here, the provisional sums include a bit sum signal (for example, S0_1) with respect to the case where carry is produced from a low order bit and a bit sum signal (for example, S1_1) with respect to the case where no carry is produced. In addition, the provisional carries include a carry signal (for example, C0_1) with respect to the case where carry s produced from a low order bit and a carry signal (for example, C1_1) with respect to the case where no carry is produced. In a second circuit stage 22, one of the two provisional sums and one of the two provisional carries are selected by multiplexers (MUXs) 120 in accordance with a carry signal from a low order bit and transferred to a next stage. In a third circuit stage 23, actual bit sums S_0 to S_3 and an output carry signal Cout are generated by actual carry signals and outputted to the outside of the adder. According to to first conventional example, because the $2^N$-bit adder can be realized by (N+1) circuit stages, the high speed operation is possible. However, in the first conventional example, because the adder includes a large number of multiplexers and the number of wirings is large, power dissipation is large.

As an adder improved to reduce power dissipation, there is a conditional carry adder of a second conventional example described in, particularly, FIG. 7 in Kuo-Hsing Cheng et al., "The improvement of conditional sum adder for low power application", 1998. IEEE ASIC Conference Proceedings, pp. 131-134. FIG. 2 is a circuit diagram of a 16-bit conditional carry adder. As shown in FIG. 2, in the second conventional example, each of conditional cells 101 (FIG. 4B is a circuit diagram) is different from the conditional cell 111 in the first conventional example. That is, each of the conditional cells 101 in a first circuit stage 31 generates an exclusive OR signal of two input bits (for example, S0_1) and provisional carries and outputs them. Here, the provisional carries are composed of a pair of signals which are a carry signal with respect to the case where carry is produced from a low order bit and a carry signal with respect to the case where no carry is produced. In a second circuit stage 32 to a fifth circuit stage 35, each carry signal to be sent to a next circuit stage is selected by a multiplexer (MUX) 120 and a carry selector 110 in accordance with a carry signal from a low order bit and transferred in succession. In a sixth circuit stage 36 including exclusive OR circuits 130, actual bit sums S_1 to S_15 are generated and outputted to the outside of the adder. According to the second conventional example, because only the provisional carries may be generated and outputted and no provisional sums are required, the number of multiplexers (one carry selector is counted as two multiplexers) can be reduced. Accordingly, power dissipation at the time of operation can be reduced.

However, when the $2^N$-bit adder is realized in the second conventional example, (N+2) circuit stages are required. In the case of comparison using a 16-bit adder, although the number of circuit stages is five in the first conventional example, the number of circuit stages is six in the second conventional example. Therefore, because the number of logic stages in a critical path is increased by one stage, it is disadvantageous to increase a circuit operation speed.

SUMMARY OF THE INVENTION

The present invention has been made in view of the above-mentioned circumstances. Therefore, an object of the present invention is to provide an adder that can operate in low power by reducing the number of unit circuits such as multiplexers and the number of wirings as compared with the first conventional example while a high speed operation at the same speed as in the first conventional example (that is, at a higher speed than in the second conventional example) is maintained.

According to the present invention, there is provided a high speed adder in which provisional carries composed of a pair of signals that indicate a case where carry is produced from a low order bit and a case where no carry is produced therefrom are generated in advance and an actual carry is selected from the provisional carries in accordance with selection information from the low order bit to increase a carry transfer speed, the adder including: carry transfer path; and a plurality of converters, each of which converts the provisional carries into provisional sums composed of a pair of signals that indicate the case where to carry is produced from the low order bit and the case where no carry is produced therefrom, the converters being provided on a predetermined portion of the carry transfer path.

According to the adder of the first conventional example, the provisional carries and the provisional sums are generated and transferred in the first circuit stage. In addition, according to the adder of the second conventional example, the provisional carries are transferred to generate actual carry signals and all actual bit sums are collectively generated in a final circuit stage. In contrast to these, according to the adder of the present invention, in a circuit stage on the way to the transfer of the carries, the provisional carries are converted into the provisional sums and transported. According to the structure of the adder of the present invention, the number of multiplexers and the number of input and output wirings for the multiplexers can be reduced as compared with the adder of the first conventional example. In addition, the adder can be realized by the number of circuit stages smaller than that in the second conventional example.

The above and other related objects and features of the present invention will be apparent by reading the following description with the accompanying drawings and novelty pointed out in the appended claims.

BRIEF DESCRIPTION OF THE DRAWINGS

In order to fully understand the drawings used in the detailed description of the present invention, the respective drawings will be briefly described, in which.

DETAILED DESCRIPTION OF THE PREFERRED EMBODIMENT

Hereinafter, a preferred embodiment of the present invention will be described in detail with reference to the drawings. Note that the following description is of a representative embodiment of the present invention and the present invention is not limited to the following description in the interpretation thereof.

Figure 2:
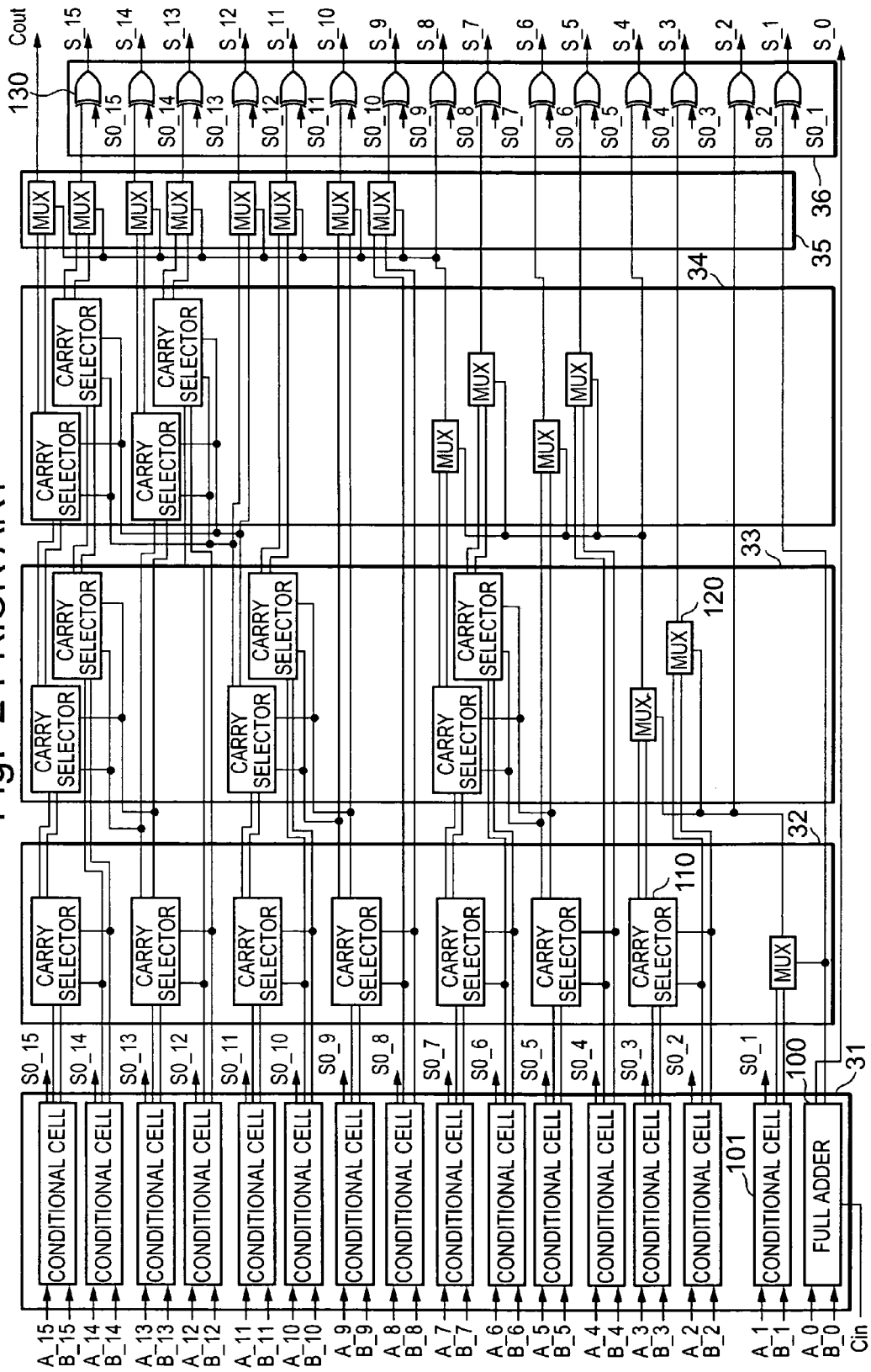
FIG. 2 is a circuit diagram in the case where a conditional carry adder of a second conventional example is applied to a 16-bit adder.
Figure 3:
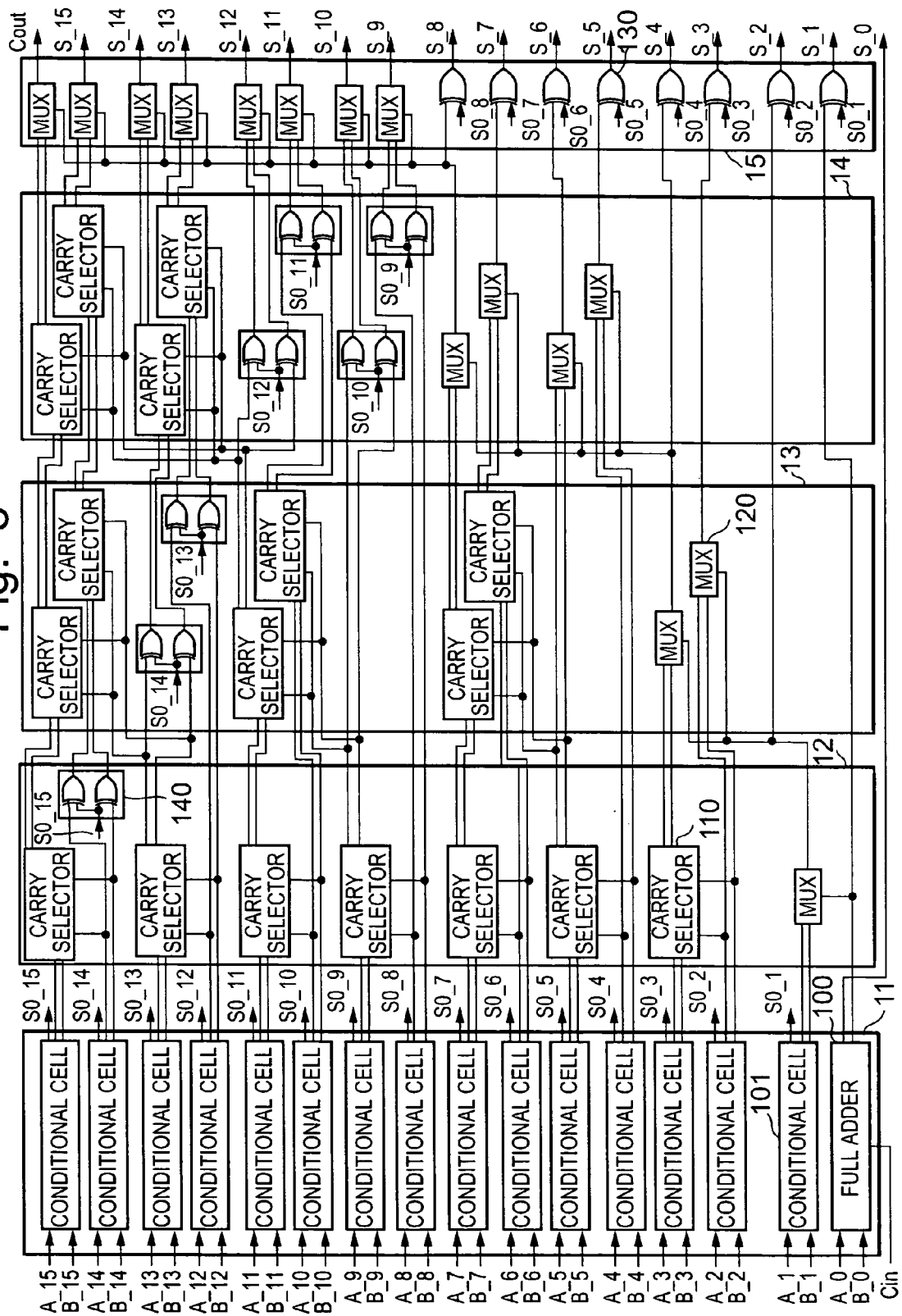
FIG. 3 is a circuit diagram showing a 16-bit adder according to an embodiment of an adder of the present invention.

FIG. 3 is a circuit diagram showing a 16-bit adder according to an embodiment of an adder of the present invention. In the adder shown in FIG. 3, as in the case of the second conventional example shown in FIG. 2, 16-bit input data (A_15 to A_0) and (B_15 to B_0) and an input carry signal Cin are inputted thereto and 16-bit sum output signals (S_15 to S_0) indicating the sums thereof and an output carry signal Cout are outputted therefrom. However, the adder shown in FIG. 3 is distinguished from the second conventional example by the following points. That is, the exclusive OR circuits that output actual bit sums S_1 to S_8 in the circuit stage 36 shown in FIG. 2 is included in a final stage, and, the exclusive OR circuits that output the actual bit sums S_9 to S_15 are replaced by each of converters 140 in which provisional carries composed of a pair of carry signals are inputted and converted into provisional sums composed of a pair of bit sum signals and the provisional sums are outputted.

Next, structures of the respective circuit stages will be described in detail.

In a $2^N$-bit adder to which to present invention is applied, a first circuit stage includes ($2^N-1$) conditional cells 101 and a full adder 100. Each of the conditional cells 101 is provided corresponding to the most significant bit to a bit larger than the least significant bit by one bit, performs exclusive OR calculation on corresponding bits of two input data which are inputted thereto, generates provisional carries composed of a pair of signals that indicate the case where carry is produced from a low order bit and the case where no carry is produced, and outputs the provisional carries. The full adder 100 generates an exclusive OR signal and a carry signal in accordance with the least significant bits of the two input data and an input carry signal, which are inputted thereto. The function of each of the conditional cells 101 and the function of the full adder 100 are the same as in the second conventional example.

Figure 4:
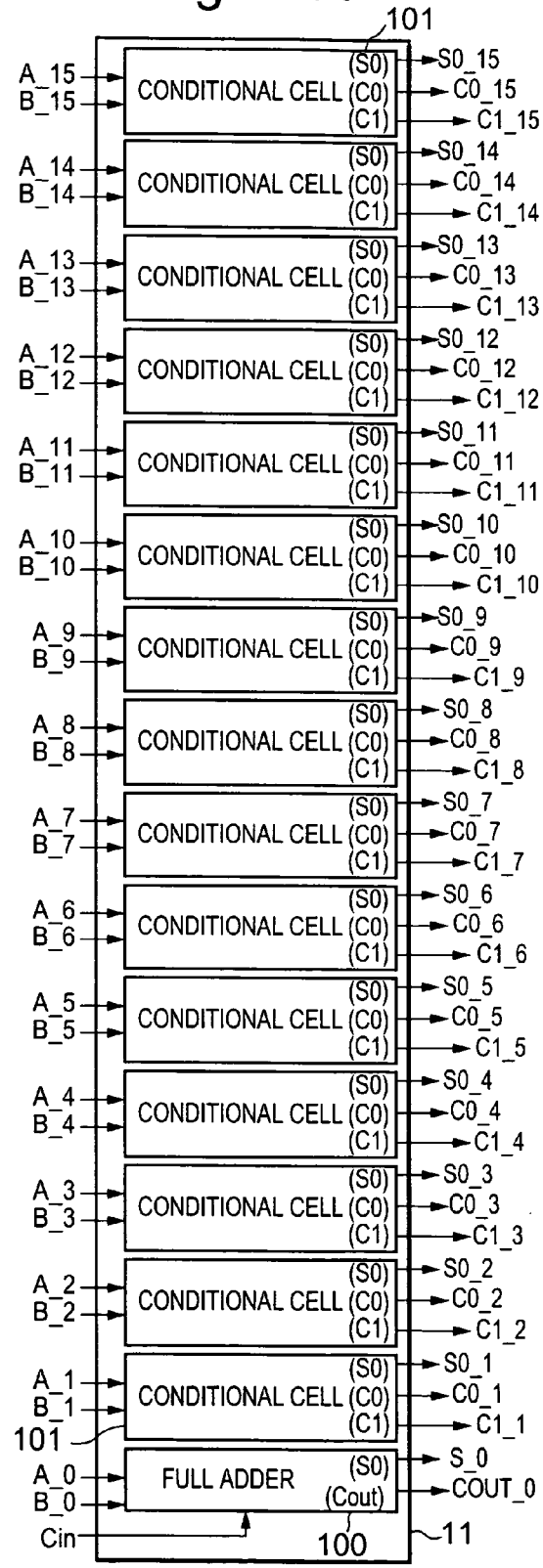
FIG. 4A shows an internal structure of a first circuit stage in the 16-bit adder and FIG. 4B is a circuit diagram showing a gate level of a conditional cell.
Figure 4:
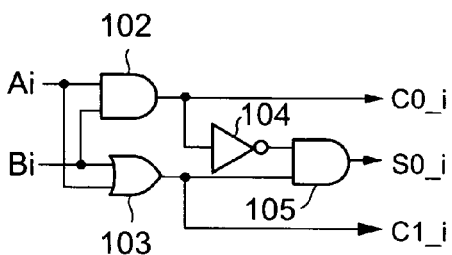

FIG. 4A shows an internal structure of a first circuit stage 11 in the 16-bit adder shown in FIG. 3. The two input data are inputted to 15 ($=2^4-1$) conditional cells 101 and the full adder. Each of the conditional cells 101 is provided for each bit of the same digit from the most significant bit in the low order direction. The full adder is provided corresponding to the least significant bit. Each of the conditional cells 101 generates an exclusive OR signal of inputted two bits (for example, S0_1). In addition, each of the conditional cells 101 generates a carry signal (for example, C0_1) in the case where it is assumed that an input carry signal from a low order bit is 0 (that is, no carry is produced) and a carry signal (for example. C1_1) in the case where it is assumed that the input carry signal from the low order bit is 1 (that is, carry is produced) and outputs the carry signals as provisional carries composed of a pair of signals. Accordingly, exclusive OR signals S0_1 to S0_15, carry signals (C0_1 to C0_15) in the case where it is assumed that no carry is produced from the low order bit, and carry signals (C1_1 to C1_15) in the case where it is assumed that carry is produced from the low order bit are outputted from the first circuit stage. The full adder 100 is used for the least significant bits. Bits A_0 and B_0 and an input carry signal Cin are simultaneously inputted to the full adder 100 and an actual bit sum S_0 and an actual carry signal Cout_0 are outputted therefrom.

FIG. 4B is a circuit diagram showing an example of an internal structure of the conditional cell 101. The conditional cell 101 includes a first gate 102 that performs AND operation on inputted two input bits (A_i, B_i), a second gate 103 that performs OR operation on the inputted two input bits, a third gate 104 that inverts the output of the first gate 102, and a fourth gate 105 that performs AND operation on the output of the second gate 103 and the output of the third gate 104. The output of the first gate 102 is given as a first carry signal (C0_i) which is the carry signal in the case where it is assumed that no carry is produced from the low order bit. The output of the second gate is given as a second carry signal (C1_i) which is the carry signal in the case where it is assumed that the carry is produced from the low order bit. The output of the fourth gate is outputted as an exclusive OR signal (S0_i) corresponding to a bit sum of the two input bits in the case where it is assumed that no carry is produced from the low order bit.

Of the second to nth circuit stages of the $2^N$-bit adder of the present invention, a (N−M+1)-th circuit stage specified by an integer M that satisfies $1 \leq M < N$ is constructed as follows.

Figure 5:
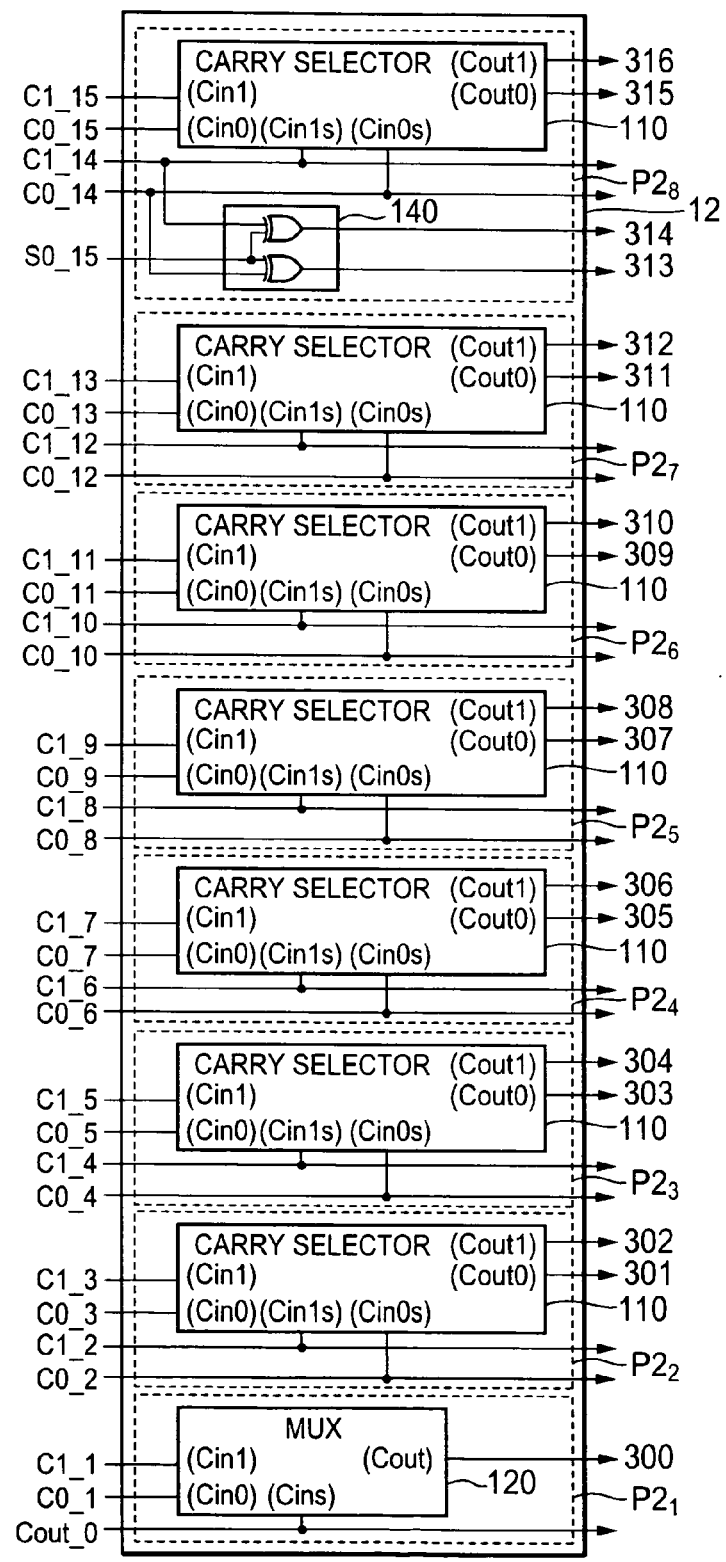
FIG. 5 shows an internal structure of a second circuit stage in the 16-bit adder.

FIG. 5 shows an internal structure of a second circuit stage 12 in the 16-bit adder of the embodiment shown in FIG. 3. The second circuit stage 12 is a circuit stage in which (N−M+1)=2. Accordingly, because N=4 in the 16-bit adder, M=3 is obtained. In the second circuit stage 12, because (N−M)=1, the circuit is divided in a virtual form into $2^M$ (=8) sub-circuits $P2_1$ to $P2_8$ corresponding to every $2^{(N-M)}=2$ bits of the input data.

In the case of such division, one multiplexer (MUX) 120 is provided corresponding to higher $2^{(N-M-1)}$ (=1) bits in the sub-circuit $P2_1$ which is a first sub-arithmetic circuit, including inputs from $2^{(N-M)}$-th (=second) bits from the least significant bits A_0 and B_0 in the high order direction. The pair of signals C0_1 and C1_1 which are the outputs of the conditional cells 101 provided for corresponding bits in the first circuit stage 11 which is the preceding circuit stage and indicate the provisional carries are inputted to the multiplexer. With respect to the multiplexer, a carry signal Cout_0 which is outputted from the full adder 100 provided for bits in the first circuit stage 11, which correspond to $(2^{(N-M-1)}+1)$-th (=second) bits from the high order in the sub-circuit P2.sub.1 is inputted there to as a selection signal. The multiplexer outputs a signal 300, which is an actual carry signal in accordance with the carry signal Cout_0.

Also, the $(2^{(N-1)}-2^{(N-M-1)})$ (=7) carry selectors 110 are provided corresponding to higher $2^{(N-M-1)}$ (=1) bit in the sub-circuit P2.sub.8 corresponding to a second sub-arithmetic circuit to which the signals C0_15 and C1_15 as the carry signals corresponding to the most significant bits A_15 and B_15 are inputted and in the corresponding sub-circuits of a third sub-arithmetic circuit including sub-circuits corresponding to the second sub-circuit P2.sub.7 and the second $((=2^{M-1})$-th) (=seventh) sub-circuit P2.sub.2 counted down from the sub-circuit P2.sub.8. The pair of signals which are outputs of the conditional cells which are provided for the corresponding bits in the first circuit stage 11 that is the preceding circuit stage are inputted to each of the carry selectors. In addition, the pair of selection signals which are the outputs of the conditional cells 101 provided for the bits in the first circuit stage 11, which correspond to $(2^{(N-M-1)}+1)$th (=second) bits from the higher bits in the sub-circuit are inputted to each of the carry selectors. Each of the carry selectors in the second sub-arithmetic circuit (P2.sub.8) and the third sub-arithmetic circuit (P2.sub.2 to P2.sub.7) selects a pair of signal indicating provisional carries or the provisional sums in the following circuit stage in accordance with the selection signals and outputs the selected signals.

In other words, the pair of signals C0_15 and C1_15 corresponding to higher order bits are inputted to the carry selector 110 included in the sub-circuit $P2^8$. Then, the carry selector 110 outputs a pair of signals 315 and 316 selected in accordance with the pair of signals C0_14 and C1_14 corresponding to $(2^{(N-M-1)}+1)$-th (=second) bits from the higher bits in the sub-circuit $P2_8$. Similarly, the pair of signals C0_13 and C1_13 corresponding to the high order bits are inputted to the carry selector 110 included in the sub-circuit $P2_7$. Then, the carry selector 110 outputs a pair of signals 311 and 312 selected in accordance with the pair of signals C0_12 and C1_12 corresponding to second bits from the higher order in the sub-circuit $P2_7$. In addition, the pair of signals C0_11 and C1_11 corresponding to the higher order bits are inputted to the carry selector 110 included in the sub-circuit $P2_6$. Then, the carry selector 110 outputs a pair of signals 309 and 310 selected in accordance with the pair of signals C0_10 and C1_10 corresponding to the second bits from the high order in the sub-circuit $P2_6$. In addition, the pair of signals C0_9 and C1_9 corresponding to the higher order bits are inputted to the carry selector 110 included in the sub-circuit $P2_5$. Then, the carry selector 110 outputs a pair of signals 307 and 308 selected in accordance with the pair of signals C0_8 and C1_8 corresponding to the second bits from the higher order in the sub-circuit $P2_5$. In addition, the pair of signals C0_7 and C1_7 corresponding to the higher order bits are inputted to the carry selector 110 included in the sub-circuit $P2_4$. Then, the carry selector 110 outputs a pair of signals 305 and 306 selected in accordance with the pair of signals C0_6 and C1_6 corresponding to the second bits from the higher order in the sub-circuit $P2_4$. In addition, the pair of signals C0_5 and C1_5 corresponding to the higher order bits are inputted to the carry selector 110 included in the sub-circuit $P2_3$. Then, the carry selector 110 outputs a pair of signals 303 and 304 selected in accordance with the pair of signals C0_4 and C1_4 corresponding to the second bits from the high order in the sub-circuit $P2_3$. In addition, the pair of signals C0_3 and C1_3 corresponding to the high order bits are inputted to the carry selector 110 included in the sub-circuit $P2_2$. Then, the carry selector 110 outputs a pair of signals 301 and 302 selected in accordance with the pair of signals C0_2 and C1_2 provided for bits corresponding to the second bits from the higher order in the sub-circuit $P2_2$.

Also, the converter 140 is provided corresponding to a lower $2^{(N-M-1)}$ (=1) bit in the sub-circuit P2.sub.8 which is the second sub-arithmetic circuit. The pair of signals C0_14 and C1_14 and the exclusive OR signal S0_15 are inputted to the converter. The pair of signals C0_14 and C1_14 are the outputs of the conditional cell 101 provided for corresponding bits in the first circuit stage 11 which is the preceding circuit stage and indicate the provisional carries. The exclusive OR signal S0_15 is outputted from the conditional cell corresponding to the bit higher by one bit in the first circuit stage 11. Then, the converter converts the inputted signals into a pair of signals 313 and 314 indicating the provisional sums and outputs the converted signals.

Figure 6A:
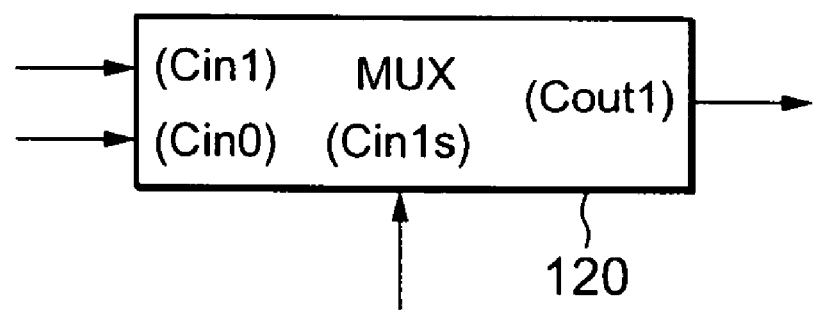
FIG. 6A shows a multiplexer and FIG. 6B shows a carry selector.

As shown in FIG. 6A, with respect to a multiplexer 120, a pair of input signals Cin0 and Cin1 are inputted thereto. One of the pair of input signals Cin0 and Cin1 is selected in accordance with a selection signal Cin1s and outputted as an output signal Cout1. When the selection signal Cin1s is 1, Cin1 is outputted as the output signal Cout1. On the other hand, when Cin1s is 0, Cin0 is outputted as Cout1.

Figure 6B:
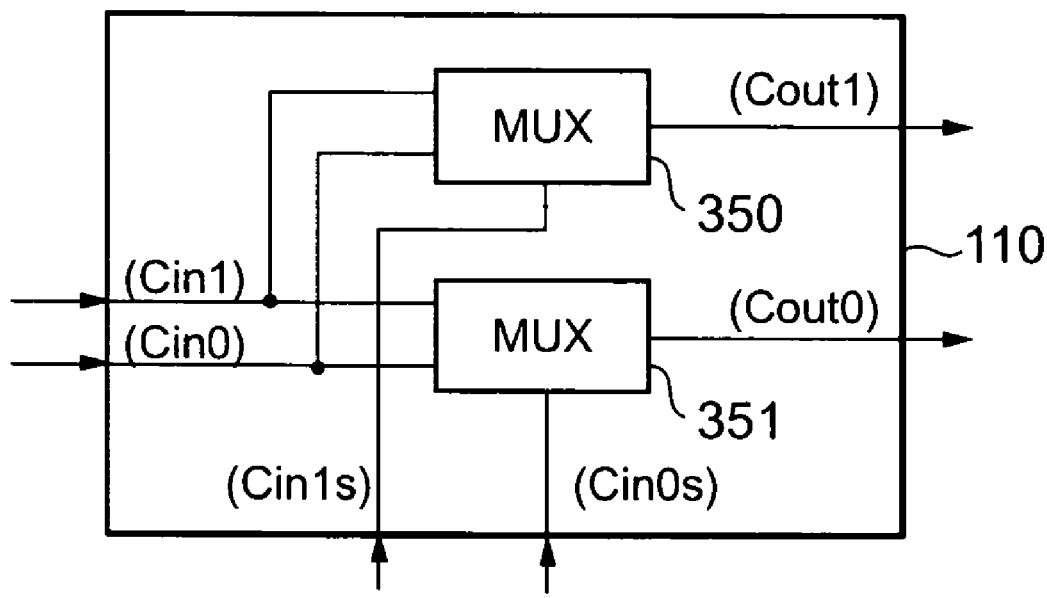

The carry selector 110 has the same function as the carry selector in the second conventional example as shown in FIG. 2. As shown in FIG. 6B, the carry selector 110 includes two multiplexers 350 and 351. When the pair of input signals Cin0 and Cin1 are inputted, the first multiplexer 351 selects one of the pair of input signals Cin0 and Cin1 in accordance with the selection signal Cin0s which is one of the pair of selection signals Cin0s and Cin1s and outputs the selected signal as an output signal Cout0 which is one of a pair of output signals of the carry selector 110. When the pair of input signals Cin0 and Cin1 are inputted, the second multiplexer 350 selects one of the input signals Cin0 and Cin1 in accordance with the selection signal Cin1s which is the other of the pair of selection signals and outputs the selected signal as an output signal Cout1 which is the other of the pair of output signals of the carry selector 110. In the multiplexer 350, when Cin1s is 1, Cin1 is selected. When Cin1s is 0, Cin0 is selected. In the multiplexer 351, when Cin0s is 1, Cin1 is selected. When Cin0s is 0, Cin0 is selected. Taking the carry selector included in the sub-circuit $P2_8$ as shown in FIG. 5 as an example, C0_15 is inputted as Cin0 in FIG. 6B, C1_15 is inputted as Cin1, C0_14 is inputted as Cin0s, C1_14 is inputted as Cin1s, the signal 315 is outputted as Cout0, and the signal 316 is outputted as Cout1.

The converter 140 will be described by using a converter included in the sub-circuit P2.sub.8 as shown in FIG. 5 as an example. The converter 140 is composed of a first exclusive OR circuit and a second exclusive OR circuit. When the signal C0_14 which is one of the pair of signals C0_14 and C1_14 indicating the provisional carries and the exclusive OR signal S0_15 outputted from the conditional cell corresponding to the bit higher by one bit in the first circuit stage 11 are inputted, the first exclusive OR circuit outputs the signal 313 which is one of the pair of signals 313 and 314 indicating the provisional sums. When the signal C1_14 which is the other of the pair of signals C0_14 and C1_14 and the exclusive OR signal S0_15 are inputted, the second exclusive OR circuit outputs the signal 314 which is the other of the pair of signals 313 and 314 indicating the provisional sums.

Figure 7:
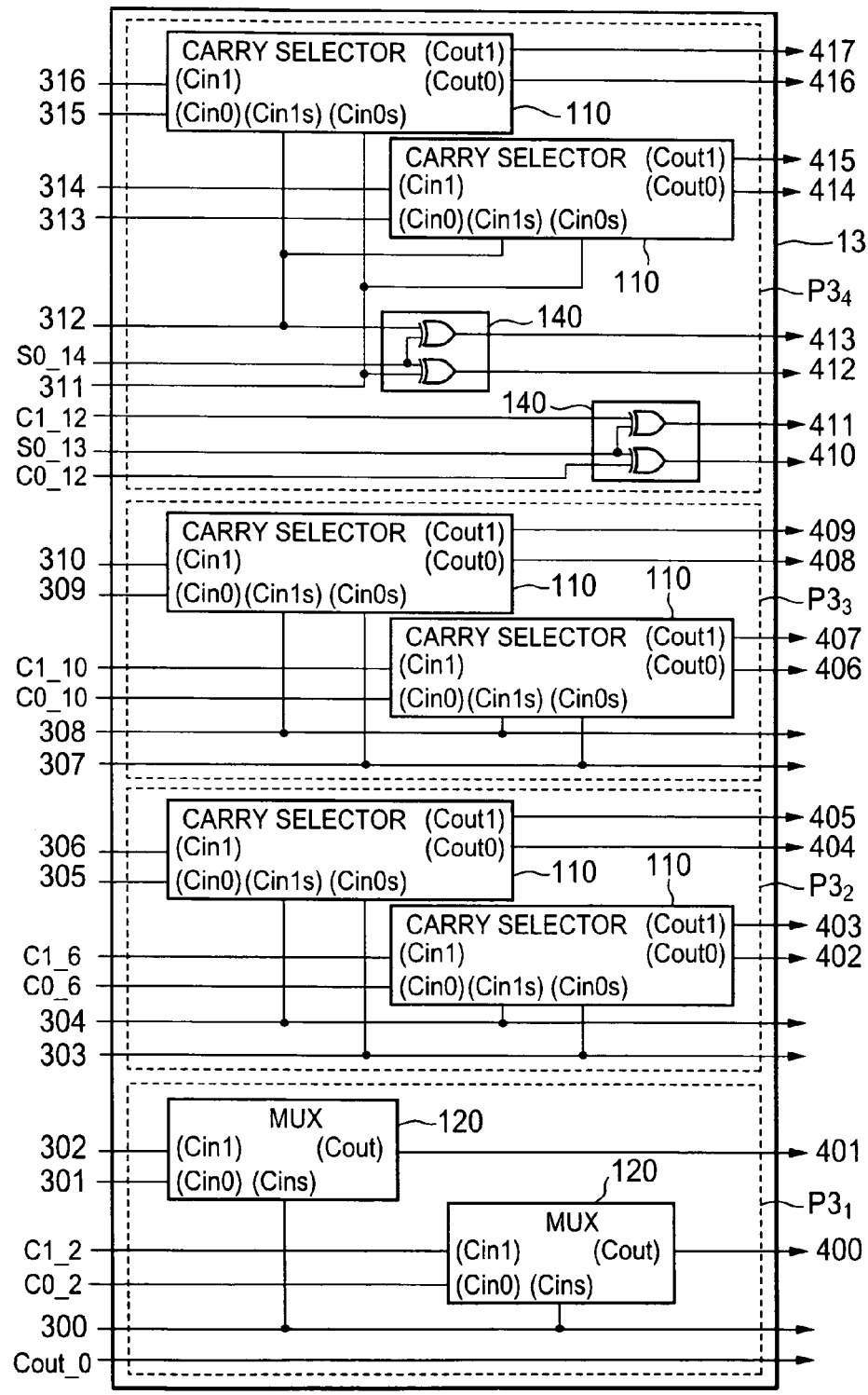
FIG. 7 shows an internal structure of a third circuit stage in the 16-bit adder.

Next, a structure of a third circuit stage 13 in the 16-bit adder shown in FIG. 3 will be described. FIG. 7 shows an internal structure of the third circuit stage 13. The third circuit stage 13 is a circuit stage in which (N−M+1)=3. Accordingly, assuming that N=4, M=2 is obtained. In the third circuit stage 13, assuming that (N−M)=2, it is divided in a virtual form into $2^M$ (=4) sub-circuits $P3_1$ to $P3_4$ corresponding to every $2^{(N-M)}$ bits of the input data.

In the case of such division, two multiplexers 120 are provided corresponding to high $2^{(N-M-1)}$ (=2) bits in the sub-circuit P3.sub.1 which is a first sub-arithmetic circuit, including inputs from $2^{(N-M)}$-th (=fourth) bits from the least significant bits A_0 and B_0 in the high order direction. The pair of signals 301 and 302 which are the outputs of the carry selector 110 provided for corresponding bits in the second circuit stage 12 which is the preceding circuit stage and indicate the provisional carries are inputted to the multiplexer provided corresponding to the high order bit. In addition, the pair of signals C0_2 and C1_2 which are the outputs of the conditional cell 101 provided for corresponding bits in the first circuit stage 11 which is the preceding circuit stage and indicate the provisional carries are inputted to the multiplexer provided corresponding to the low order bit. With respect to these multiplexers, the signal 300 which is outputted from the multiplexer 120 provided for bits in the circuit stage 12, which correspond to $(2^{(N-M-1)}+1)$-th (=third) bits from the high order in the sub-circuit P3.sub.1 is inputted thereto as a selection signal. The multiplexer provided corresponding to the high order bit outputs a signal 401, which is an actual carry signal in accordance with the signal 300. In addition, the multiplexes provided corresponding to the low bit outputs 400, which is an actual carry signal in accordance with the signal 300.

Also, the $(2^{(N-1)}-2^{(N-M-1)})$ (=6) carry selectors 110 are provided corresponding to each high $2^{(N-M-1)}$ (=2) bits in the sub-circuit P3.sub.4 corresponding to a second sub-arithmetic circuit to which the signals 315 and 316 as the provisional carry signals corresponding to the most significant bits A_15 and B_15 are inputted and in the corresponding sub-circuits of a third sub-arithmetic circuit including sub-circuits corresponding to the second sub-circuit P3.sub.3 and the third ((=2.sup.M−1)-th)) sub-circuit P3.sub.2 from the sub-circuit P3.sub.4 in the low order direction. The pair of signals from any one of the conditional cell 101, the carry selector 110, and the converter 140, which are provided for the corresponding bits in the preceding circuit stages are inputted to each of the carry selectors. In addition, the pair of selection signals which are the outputs of the carry selector 110 provided for to bits in the second circuit stage 12, which correspond to $(2^{(N-M-1)}+1)$-th (=third) bits from the high order in the sub-circuit are inputted to each of the carry selectors. Each of the carry selectors in the second sub-arithmetic circuit (P3.sub.4) and the third sub-arithmetic circuit (P3.sub.2 to P3.sub.3) selects a pair of signals indicating provisional carries or the provisional sums in the following circuit stage in accordance with the selection signals and outputs the selected signals.

In other words, the pair of signals 315 and 316 which are the outputs of the carry selector in the second circuit stage 12 are inputted to the carry selector provided corresponding to the high order bit, of the two carry selectors 110 included in the sub-circuit $P3_4$. Then, the carry selector performs selection in accordance with the pair of signals 311 and 312 which are the outputs of the carry selector in the second circuit stage 12, which is provided for the bits corresponding to $(2^{(N-M-1)}+1)$-th (=third) bits from the high order in the sub-circuit $P3_4$ and outputs a pair of signals 416 and 417. The pair of signals 313 and 314 which are the outputs of the carry selector in the second circuit stage 12 are inputted to the carry selector provided corresponding to the low order bit in the sub-circuit $P3_4$. Then, the carry selector performs selection in accordance with the pair of selection signals 311 and 312 and outputs a pair of signals 414 and 415. Similarly, the pair of signals 309 and 310 which are the outputs of the carry selector in the second circuit stage 12 are inputted to the carry selector provided corresponding to the high order bit, of the two carry selectors 110 included in the sub-circuit $P3_3$. Then, the carry selector performs selection in accordance with the pair of selection signals 307 and 308 which are the outputs of the carry selector in the second circuit stage 12, which is provided for the bits corresponding to $(2^{(N-M-1)}+1)$-th (=third) bits from the high order in the sub-circuit $P3_3$ and outputs a pair of signals 408 and 409. The pair of signals C0_10 and C1_10 which are the outputs of the conditional cell in the first circuit stage 11 are inputted to the carry selector provided corresponding to the low order bit in the sub-circuit $P3_3$. Then, the carry selector performs selection in accordance with the pair of selection signals 307 and 308 and outputs a pair of signals 406 and 407. In addition, the pair of signals 305 and 306 which are the outputs of the carry selector in the second circuit stage 12 are inputted to the carry selector provided corresponding to the high order bit, of the two carry selectors 110 included in the sub-circuit $P3_2$. Then, the carry selector performs selection in accordance with the pair of selection signals 303 and 304 which are the outputs of the carry selector in the second circuit stage 12, which is provided for the bits corresponding to $(2^{(N-M-1)}+1)$-th (=third) bits from the high order in the sub-circuit $P3_2$ and outputs a pair of signals 404 and 405. The pair of signals C0_6 and C1_6 which are the outputs of the conditional cell in the first circuit stage 11 are inputted to the carry selector provided corresponding to the low order bit in the sub-circuit $P3_2$. Then, the carry selector performs selection in accordance with the pair of selection signals 303 and 304 and outputs a pair of signals 402 and 403.

Also, the two converters 140 are provided corresponding to lower $2^{(N-M-1)}$ (=2) bits in the sub-circuit P3.sub.4 which is the second sub-arithmetic circuit. The pair of signals 311 and 312 and the exclusive OR signal S0_14 are inputted to the first converter from the top, of the two converters 140. The pair of signals 311 and 312 are the outputs of the carry selector 110 provided for corresponding bits in the second circuit stage 12 which is the preceding circuit stage and indicate the provisional carries. The exclusive OR signal S0_14 is outputted from the conditional cell corresponding to the bit higher by one bit in the first circuit stage 11. Then, the first converter from the top converts the inputted signals into a pair of signals 412 and 413 indicating the provisional sums and outputs the converted signals. The pair of signals C0_12 and C1_12 and the exclusive OR signal S0_13 are inputted to second converter from the top, of the two converters 140. The pair of signals C0_12 and C1_12 are the outputs of the carry selector 110 provided for corresponding bits in the first circuit stage 11 which is the preceding circuit stage and indicate the provisional carries. The exclusive OR signal S0_13 is outputted from the conditional cell corresponding to the bit higher by one bit in the first circuit stage 11. Then, the second converter from the top converts the inputted signals into a pair of signals 410 and 411 indicating the provisional sums and outputs the converted signals.

Figure 8:
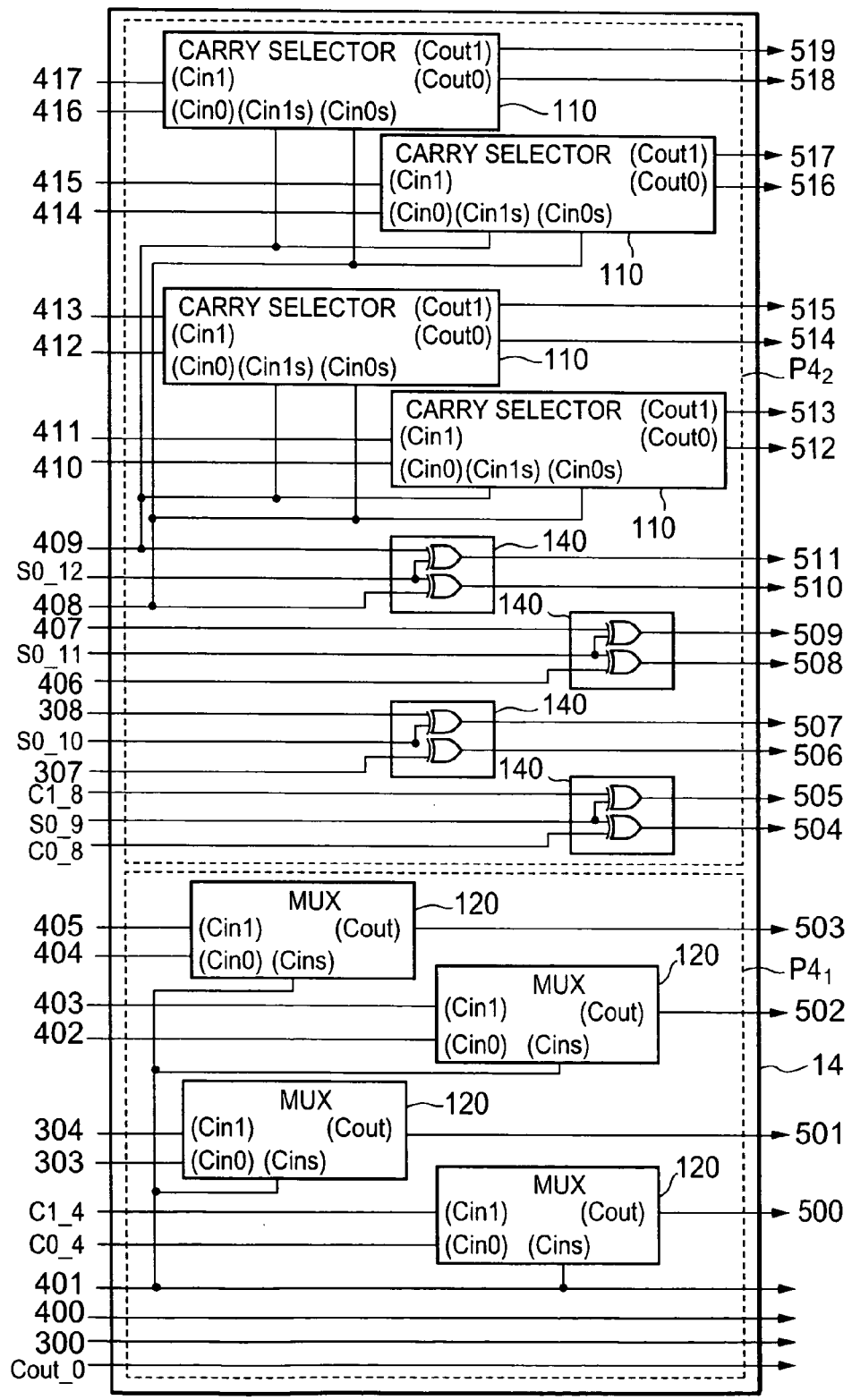
FIG. 8 shows an internal structure of a fourth circuit stage in the 16-bit adder.

Next, a structure of a fourth circuit stage 14 in the 16-bit adder shown in FIG. 3 will be described. FIG. 8 shows an internal structure of the fourth circuit stage 14. The fourth circuit stage 14 is a circuit stage in which (N−M+1)=4. Accordingly, assuming that N=4, M=1 is obtained. In the fourth circuit stage 14, assuming that (N−M)=3, it is divided in a virtual form into $2^M$ (=2) sub-circuits P4$_1$ and P4$_2$ corresponding to every $2^{(N-M)}$ (=8) bits of the input data.

In the case of such division, four multiplexers 120 are provided corresponding to high $2^{(N-M-1)}$ (=4) bits in the sub-circuit P4.sub.1 which is a first sub-arithmetic circuit, including inputs from $2^{(N-M)}$-th (=eighth) bits from the least significant bits A_0 and B_0 in the high order direction. The pair of signals 404 and 405 which are the outputs of the carry selector 110 provided for corresponding bits in the third circuit stage 13 which is the preceding circuit stage, and which indicate the provisional carries are inputted to the first multiplexer from the top. The signal 401, which is outputted from the multiplexer 120 provided for the bits in the third circuit stage 13, which correspond to $(2^{(N-M-1)}+1)$-th (=fifth) bits from the high order in the sub-circuit P4.sub.1, is used as a selection signal. Then, the first multiplexer from the top selects an actual carry signal in accordance with the selection signal and outputs a signal 503. The pair of signals 402 and 403 which are the outputs of the carry selector 110 provided for corresponding bits in the third circuit stage 13 which is the preceding circuit stage, and which indicate the provisional carries are inputted to the second multiplexer from the top. The signal 401 is used as the selection signal. Then, the second multiplexer from the top selects an actual carry signal in accordance with the selection signal and outputs a signal 502. The pair of signals 303 and 304 which are the outputs of the carry selector 110 provided for corresponding bits in the second circuit stage 12 which is the preceding circuit stage, and which indicate the provisional carries are inputted to the third mulitplexer from the top. The signal 401 is used as the selection signal. Then, the third multiplexer form the top selects an actual carry signal in accordance with the selection signal and outputs a signal 501. The pair of signals C0_4 and C1_4 which are the outputs of the conditional cell 101 provided for corresponding bits in the first circuit stage 11 which is the preceding circuit stage, and which indicate the provisional carries are inputted to the fourth multiplexer from the top. The signal 401 is used as the selection signal. Then, the fourth multiplexer from the top selects an actual carry signal in accordance with the selection signal and outputs a signal 500.

Also, the $(2^{(N-1)}-2^{(N-M-1)})$ (=4) carry selectors 110 are provided corresponding to high $2^{(N-M-1)}$ (=4) bits in the sub-circuit P4.sup.2 corresponding to a second sub-arithmetic circuit to which the signals 416 and 417 as the carry signals corresponding to the most significant bits A_15 and B_15 are inputted. The pair of signals outputted from any one of the conditional cell 101, the carry selector 110, and the converter 140, which are provided for the corresponding bits in the preceding circuit stages are inputted to each of the carry selectors. In addition, the pair of selection signals which are outputted from the carry selector 110 provided for the bits in the third circuit stage 13, which correspond to $(2^{(N-M-1)}+1)$-th (=fifth) bits from the high order in the sub-circuit P4.sub.2 are inputted to each of the carry selectors. Each of the carry selectors selects a pair of signal indicating provisional carries or the provisional sums in the following circuit stage in accordance with the selection signals and outputs the selected signals.

In other words, the pair of signals 416 and 417 which are the outputs of the carry selector in the third circuit stage 13 are inputted to the first carry selector from the top, of the four carry selectors 110 included in the sub-circuit P4.sub.2. Then, the first carry selector from the top performs selection in accordance with the pair of selection signals 408 and 409 which are the outputs of the carry selector in the third circuit stage 13, which is provided for the bits corresponding to $(2^{(N-M-1)}+1)$-th (=fifth) bits from the high order in the sub-circuit P4.sub.2 and outputs a pair of signals 518 and 519. Similarly, the pair of signals 414 and 415 which are the outputs of the carry selector in the third circuit stage 13 are inputted to the second carry selector from the top. Then, the second carry selector from the top performs selection in accordance with the pair of selection signals 408 and 409 and outputs a pair of signals 516 and 517. In addition, the pair of signals 412 and 413 which are the outputs of the carry selector in the third circuit stage 13 are inputted to the third carry selector from the top. Then, the third carry selector from the top performs selection in accordance with the pair of selection signals 408 and 409 and outputs a pair of signals 514 and 515. In addition, the pair of signals 410 and 411 which are the outputs of the carry selector in the third circuit stage 13 are inputted to the lowest order carry selector, that is, the fourth carry selector from the top. Then, the fourth carry selector from the top performs selection in accordance with the pair of selection signals 408 and 409 and outputs a pair of signals 512 and 513.

Also, the four converters 140 are provided corresponding to low $2^{(N-M-1)}$ (=4) bits in the sub-circuit P4.sub.2 which is the second sub-arithmetic circuit. The pair of signals 408 and 409 and the exclusive OR signal S0_12 are inputted to the first converter from the top, of the four converters 140. The pair of signals 408 and 409 are the outputs of the carry selector 110 provided for corresponding bits in the third circuit stage 13 which is the preceding circuit stage and indicate the provisional carries. The exclusive OR signal S0_12 is outputted from the conditional cell corresponding to the bit higher by one bit in the first circuit stage 11. Then, the first converter from the top converts the inputted signals into a pair of signals 510 and 511 indicating the provisional sums and outputs the converted signals. Similarly, the pair of signals 406 and 407 and the exclusive OR signal S0_11 are inputted to the second converter from the top. The pair of signals 406 and 407 are the outputs of the carry selector 110 provided for corresponding bits in the third circuit stage 13 which is the preceding circuit stage and indicate the provisional carries. The exclusive OR signal S0_11 is outputted from the conditional cell corresponding to the bit higher by one bit in the first circuit stage 11. Then, the second converter from the top converts the inputted signals into a pair of signals 508 and 509 indicating the provisional sums and outputs the converted signals. In addition, the pair of signals 307 and 308 and the exclusive OR signal SO_10 are inputted to the third converter from the top. The pair of signals 307 and 308 are the outputs of the carry selector 110 provided for corresponding bits in the second circuit stage 12 which is the preceding circuit stage and indicate the provisional carries. The exclusive OR signal S0_10 is outputted from the conditional cell corresponding to the bit higher by one bit in the first circuit stage 11. Then, the third converter from the top converts the inputted signals into a pair of signals 506 and 507 indicating the provisional sums and outputs the converted signals. In addition, the pair of signals C0_8 and C1_8 and the exclusive OR signal S0_9 are inputted to the lowest order converter, that is, the fourth converter from the top. The pair of signals C0_8 and C1_8 are the outputs of the conditional cell 101 provided for corresponding bits in the first circuit stage 11 which is the preceding circuit stage and indicate the provisional carries. The exclusive OR signal S0_9 is outputted from the conditional cell corresponding to the bit higher by one bit in the first circuit stage 11. Then, the fourth converter from the top converts the inputted signals into a pair of signals 504 and 505 indicating the provisional sums and outputs the converted signals.

Figure 9:
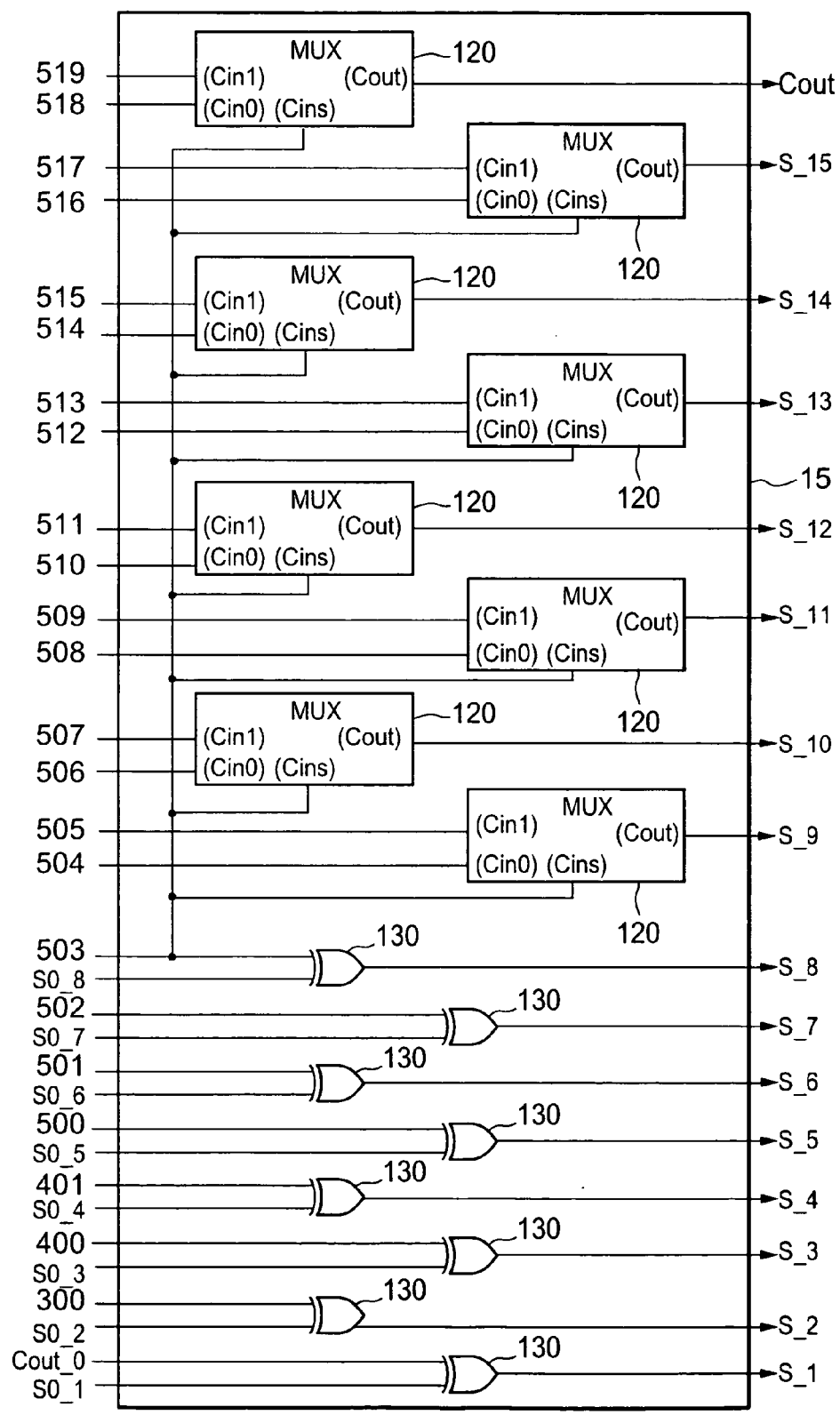
FIG. 9 shows an internal structure of a fifth circuit stage in the 16-bit adder.

FIG. 9 is a circuit diagram showing a (N+1)-th (=fifth) circuit stage 15 in the 16-bit adder to which the present invention is applied. The fifth circuit stage 15 includes $2^{(N-1)}$ (=8) multiplexers 120 and $2^{(N-1)}$ (=8) exclusive OR circuits 130.

The pair of signals 518 and 519 outputted from the first carry selector 110 from the top in the fourth circuit stage 14 are inputted to the multiplexer provided in the bit position corresponding to the most significant bits A_15 and B_15 of the input data. Then, the multiplexer selects an output carry signal Cout in accordance with the selection signal 503 outputted from the multiplexer in the fourth circuit stage 14, which corresponds to $(2^{(N-1)}+1)$-th (=ninth) bits from the most significant bits of the input data in the low order direction, and outputs the output carry signal Cout to the outside of the adder.

The pair of signals outputted from the carry selector or the converter which are provided for corresponding bits in the fourth circuit stage 14 are inputted to each of the $(2^{(N-1)}-1)$ (=7) multiplexers provided for bits corresponding to 2 to $(2^{(N-1)}-1)$-th (=eighth) from the most significant bits of the input data in the low order direction. Then, each of the multiplexers performs selection in accordance with the selection signal 503 outputted from the multiplexer in the fourth circuit stage 14, which corresponds to $(2^{(N-1)}+1)$-th (=ninth) bits from the most significant bits of the input data in the low order direction, and outputs a signal indicating an actual bit sum with respect to the bit higher by one bit. That is, the pair of signals 516 and 517 indicating the provisional sums are inputted from the carry selector provided for corresponding bits in the fourth circuit stage to the second multiplexer from the top. Then, the second multiplexer from the top performs selection in accordance with the selection signal 503 which is an actual carry and outputs a signal S_15 indicating the actual bit sum with respect to the bit higher by one bit to the outside of the adder. The pair of signals 514 and 515 indicating the provisional sums are inputted from the carry selector provided for corresponding bits in the fourth circuit stage to the third multiplexer from the top. Then, the third multiplexer from the top performs selection in accordance with the selection signal 503 and outputs a signal S_14 indicating the actual bit sum with respect to the bit higher by one bit to the outside. The pair of signals 512 and 513 indicating the provisional sums are inputted from the carry selector provided for corresponding bits in the fourth circuit stage to the fourth multiplexer from the top. Then, the fourth multiplexer from the top performs selection in accordance with the selection signal 503 and outputs a signal S_13 indicating the actual bit sum with respect to the bit higher by one bit to the outside. The pair of signals 510 and 511 indicating the provisional sums are inputted from the converter provided for corresponding bits in the fourth circuit stage to the fifth multiplexer from the top. Then, the fifth multiplexer from the top performs selection in accordance with the selection signal 503 and outputs a signal S_12 indicating the actual bit sum with respect to the bit higher by one bit to the outside. The pair of signals 508 and 509 indicating the provisional sums are inputted from the converter provided for corresponding bits in the fourth circuit stage to the sixth multiplexer from the top. Then, the sixth multiplexer from the top performs selection in accordance with the selection signal 503 and outputs a signal S_11 indicating the actual bit sum with respect to the bit higher by one bit to the outside. The pair of signals 506 and 507 indicating the provisional sums are inputted from the converter provided for corresponding bits in the fourth circuit stage to the seventh multiplexer from the top. Then, the seventh multiplexer from the top performs selection in accordance with the selection signal 503 and outputs a signal S_10 indicating the actual bit sum with respect to the bit higher by one bit to the outside. The pair of signals 504 and 505 indicating the provisional sums are inputted from the converter provided for corresponding bits in the fourth circuit stage to the eighth multiplexer from the top. Then, the eighth multiplexer from the top performs selection in accordance with the selection signal 503 and outputs a signal S_9 indicating the actual bit sum with respect to the bit higher by one bit to the outside.

The signal outputted from the full adder or the multiplexer which are provided for corresponding bits in the preceding circuit stages and the exclusive OR signal outputted from the conditional cell corresponding to the bit higher by one bit in the first circuit stage 11 are inputted to each of the $2^{(N-1)}$ (=8) exclusive OR circuits 130 provided for bits corresponding to $(2^{(N-1)}+1)$-th to $2^N$-th (that is, ninth to sixteenth) bits from the most significant bits of the input data in the low order direction. Then, each of the exclusive OR circuits outputs a signal indicating an actual bit sum with respect to the bit higher by one bit to the outside of the adder. That is, when the signal 503 outputted from the multiplexer provided for corresponding bits in the fourth circuit stage 14 and the exclusive OR signal S0_8 outputted from the conditional cell corresponding to the bit higher by one bit in the first circuit stage 11 are inputted to the exclusive OR circuit corresponding to the ninth bits from the most significant bits, the exclusive OR circuit outputs a signal S_8 indicating the actual bit sum with respect to the bit higher by one bit to the outside. Similarly, when the signal 502 outputted from the multiplexer provided for corresponding bits in the fourth circuit stage 14 and the exclusive OR signal S0_7 outputted from the conditional cell corresponding to the bit higher by one bit in the first circuit stage 11 are inputted to the exclusive OR circuit corresponding to the tenth bits from the most significant bits, the exclusive OR circuit outputs a signal S_7 indicating the actual bit sum with respect to the bit higher by one bit to the outside. When the signal 501 outputted from the multiplexer provided for corresponding bits in the fourth circuit stage 14 and the exclusive OR signal S0_6 outputted from the conditional cell corresponding to the bit higher by one bit in the first circuit stage 11 are inputted to the exclusive OR circuit corresponding to the eleventh bits from the most significant bits, the exclusive OR circuit outputs a signal S_6 indicating the actual bit sum with respect to the bit higher by one bit to the outside. When the signal 500 outputted from the multiplexer provided for corresponding bits in the fourth circuit stage 14 and the exclusive OR signal S0_5 outputted from the conditional cell corresponding to the bit higher by one bit in the first circuit stage 11 are inputted to the exclusive OR circuit corresponding to the twelfth bits from the most significant bits, the exclusive OR circuit outputs a signal S_5 indicating the actual bit sum with respect to the bit higher by one bit to the outside. When the signal 401 outputted from the multiplexer provided for corresponding bits in the third circuit stage 13 and the exclusive OR signal S0_4 outputted from the conditional cell corresponding to the bit higher by one bit in the first circuit stage 11 are inputted to the exclusive OR circuit corresponding to the thirteenth bits from the most significant bits, the exclusive OR circuit outputs a signal S_4 indicating the actual bit sum with respect to the bit higher by one bit to the outside. When the signal 400 outputted from the multiplexer provided for corresponding bits in the third circuit stage 13 and the exclusive OR signal S0_3 outputted from the conditional cell corresponding to the bit higher by one bit in the first circuit stage 11 are inputted to the exclusive OR circuit corresponding to the fourteenth bits from the most significant bits, the exclusive OR circuit outputs a signal S_3 indicating the actual bit sum with respect to the bit higher by one bit to the outside. When the signal 300 outputted from the multiplexer provided for corresponding bits in the second circuit stage 12 and the exclusive OR signal S0_2 outputted from the conditional cell corresponding to the bit higher by one bit in the first circuit stage 11 are inputted to the exclusive OR circuit corresponding to the fifteenth bits from the most significant bits, the exclusive OR circuit outputs a signal S_2 indicating the actual bit sum with respect to the bit higher by one bit to the outside. When the signal Cout_0 outputted from the full adder 100 provided for corresponding bits in the first circuit stage 11 and the exclusive OR signal S0_1 outputted from the conditional cell corresponding to the bit higher by one bit in the first circuit stage are inputted to the exclusive OR circuit corresponding to the sixteenth bits from the most significant bits, the exclusive OR circuit outputs a signal S_1 indicating the actual bit sum with respect to the bit higher by one bit to the outside.

Next, the operation of the adder of the present invention will be described with reference to the drawings.

In FIG. 4A that shows the first circuit stage 11 shown in FIG. 3, two input data are inputted to the conditional cells 101 for each of identical bits. As shown in FIG. 4B, in each of the conditional cells, an AND signal of two input bits Ai and Bi is outputted therefrom as a carry signal C0_i with respect to the case where no carry is produced from the low order, an OR signal of the two input bits is outputted therefrom as a carry signal C1_i with respect to the case where carry is produced from the low order, and an exclusive OR signal of the two input bits is outputted therefrom as an exclusive OR signal S0_i corresponding to a bit sum with respect to the case where it is assumed that no carry is produced from the low order. These outputs correspond to the provisional carry signals C0_1 to C0_15 generated in the case where it is assumed that no carry is produced from the low order, the provisional carry signals C1_1 to C1_15 generated in the case where it is assumed that carry is produced from the low order, and the exclusive OR signals S0_1 to S0_15, respectively. Because A_0, B_0, and the input carry signal Cin are inputted from the outside of the adder to the full adder 100 corresponding to the least significant bits, the full adder 100 outputs the actual bit sum signal S_0 and the actual carry signal Cout_0 to the high order bit.

Next, in the second circuit stage 12, the provisional carry signals generated in each of the bits are divided corresponding to the sub-circuits P2.sub.1 to P2.sub.8 for every two bits. Each of the sub-circuits P2.sub.1 to P2.sub.8 generates new provisional carries selected in accordance with the provisional carries from the bit lower by one bit and outputs the new provisional carries. The selection of the provisional carries is performed by the carry selector 110 shown in FIG. 6B. The provisional carries from the bit lower by one bit, which are inputted as the selection signals to each of the carry selectors in the second circuit stage 12 are generated while assuming the case where carry is produced from the bit further lower by one bit and the case where no carry is produced therefrom. Accordingly, the provisional carry signal outputted from a Cout1 terminal of each of the carry selectors in the second circuit stage 12 is generated while assuming the case where carry is produced from the bit lower by two bits. In addition, the provisional carry signal outputted from a Cout0 terminal of each of the carry selectors is generated while assuming the case where no carry is produced from the bit lower by two bits. That is, because the carry signal Cout_0 of the least significant bit is the actual carry signal, the multiplexer corresponding to the second bit from the least significant bit (that is, the multiplexer 120 in the sub-circuit P2.sub.1) selects the actual carry signal 300 from the pair of signals C0_1 and C1_1 indicating the provisional carries and outputs the actual carry signal 300.

Also, when the pair of signals C1_14 and C0_14 and the signal S0_15 are inputted to the converter 140 in the sub-circuit P2₈, the converter 14 generates the pair of signals 314 and 313 and outputs them. The pair of signals 314 and 313 correspond to the provisional sums generated while assuming the case where carry is produced from the low order and the case where no carry is produced therefrom.

Next, in FIG. 7 that shows the third circuit stage 13 shown in FIG. 3, the provisional carries and the provisional sums which are inputted thereto are divided corresponding to the sub-circuits P3.sub.1 to P3.sub.4 for every four bits. In the k(k is 2, 3, or 4)-th sub-circuit P3.sub.k, the provisional carries composed of the pair of signals generated in the high two bits are selected in accordance with the provisional carries from the third bit from the most significant bit in the sub-circuit P3.sub.k, so that new provisional carries are generated and outputted. Here, the provisional carries used as the selection signals are generated while assuming the presence or absence of carry from the most significant bit in the sub-circuit P3.sub.k−1 lower by one order. Therefore, the provisional carries and the provisional sums which are newly generated in the sub-circuit P3.sub.k and outputted there from are all generated while assuming the presence or absence of carry from the most significant bit in the sub-circuit P3.sub.k-1 lower by one order. In the lowest order sub-circuit P3.sub.1, the signal 300 corresponding to the third bit from the most significant bit is the actual carry signal; Therefore, the signals 401 and 400 which are selected using the signal 300 as the selection signal by the two multiplexers included in the sub-circuit P3.sub.1 and outputted therefrom are the actual carry signals.

Also, when the pair of signals 312 and 311 and the signal S0_14 are inputted to the high order converter of the two converters 140 included in the sub-circuit P3₄, the high order converter generates the pair of signals 413 and 412 and outputs them. When the pair of signals C1_12 and C0_12 and the signal S0_13 are inputted to the low order converter, the low order converter generates the pair of signals 411 and 410 and outputs them. In these converters, the pair of signals 413 and 412 and the pair of signals 411 and 410 correspond to the provisional sums generated while assuming the case where carry is produced from the low order and the case where no carry is produced therefrom. The output signals 415 to 410 of the sub-circuit P3₄ correspond to the provisional sums corresponding to the high three bits and are generated while assuming the presence or absence of carry from the most significant bit in the sub-circuit P3$_3$ lower by one order.

Next, in FIG. 8 that shows the fourth circuit stage 14, the provisional carries and the provisional sums which are inputted thereto are divided corresponding to the sub-circuits P4.sub.1 and P4.sub.2 for every eight bits. In the sub-circuit P4.sub.2, the provisional carries and the provisional sums which are composed of the pair of signals generated in the high four bits are selected in accordance with the provisional carries 408 and 409 from the fifth bit from the most significant bit in the sub-circuit P4.sub.2, so that new provisional carries and new provisional sums are generated and outputted. Here, the pair of provisional carry signals 408 and 409 used as the selection signals are generated while assuming the presence or absence of carry from the most significant bit in the sub-circuit P4.sub.1 lower by one order. Therefore, the provisional carries and the provisional sums which are newly generated in the sub-circuit P4.sub.2 and outputted therefrom are all generated while assuming the presence or absence of carry from the most significant bit in the subcircuit P4.sub.1 lower by one order. In the low order sub-circuit P4.sub.1, the signal 401 corresponding to the fifth bit from the most significant bit is the actual carry signal. Therefore, all the signals 503, 502, 501, and 500 which are selected using the signal 401 as the selection signal by the four multiplexers included in the sub-circuit P4.sub.1 and outputted therefrom are the actual carry signals.

Also, when the pair of signals 409 and 408 and the signal S0_12 are inputted to the highest order converter of the four converters 140 included in the sub-circuit P4$_2$, the highest order converter generates the pair of signals 511 and 510 and outputs the signals 511 and 510. When the pair of signals 407 and 406 and the signal S0_11 are inputted to the second converter from the top, the second converter generates the pair of signals 509 and 508 and outputs the signals 509 and 508. When the pair of signals 308 and 307 and the signal S0_10 are inputted to the third converter from the top, the third converter generates the pair of signals 507 and 506 and outputs the signals 507 and 506. When the pair of signals C1_8 and C0_8 and the signal S0_9 are inputted to the fourth converter from the top, the fourth converter generates the pair of signals 505 and 504 and outputs the signals 505 and 504. Here, the pair of signals 511 and 510, the pair of signals 509 and 508, the pair of signals 507 and 506, and the pair of signals 505 and 504 correspond to the provisional sums generated to intend the case where carry is produced from the low order and the case where no carry is produced therefrom. That is, the output signals 517 to 504 of the sub-circuit P4$_2$ correspond to the provisional sums corresponding to the high seven bits and are generated to intend the presence or absence of carry from the most significant bit in the low order sub-circuit P4$_1$.

Next in FIG. 9 that shows the fifth circuit stage 15 which is the final stage as shown in FIG. 3, the provisional sums are inputted to seven multiplexers (second to eighth multiplexers from the top) of the multiplexers provided corresponding to eight bits from the most significant bit. The seven multiplexers perform selection in accordance with the actual carry signal 503 from the ninth bit from the most significant bit and output the signals S_15 to S_9 which are the actual bit sum signals to the outside of the adder. The multiplexer corresponding to the most significant bit selects one of the pair of signals 519 and 518 indicating the provisional carries in accordance with the signal 503 and outputs the output carry signal Cout as a carry signal generated by adding the two input data to the outside of the adder. With respect to the ninth to sixteenth bits from the most significant bit, the actual carry signals are determined after the operation of the fourth circuit stage 14. Accordingly, as shown in FIG. 9, the eight exclusive OR circuits generate the actual bit sums S_8 to S_1 by exclusive OR operation between the actual carry signals and the bit sum signal S0_8 to S0_1 generated in the first circuit stage 11, and output the generated actual bit sums S_8 to S_1 to the outside of the adder. The signal S_0 generated in the first circuit stage 11 is outputted as the actual bit sum of the least significant bit to the outside of the adder without processing.

Figure 1:
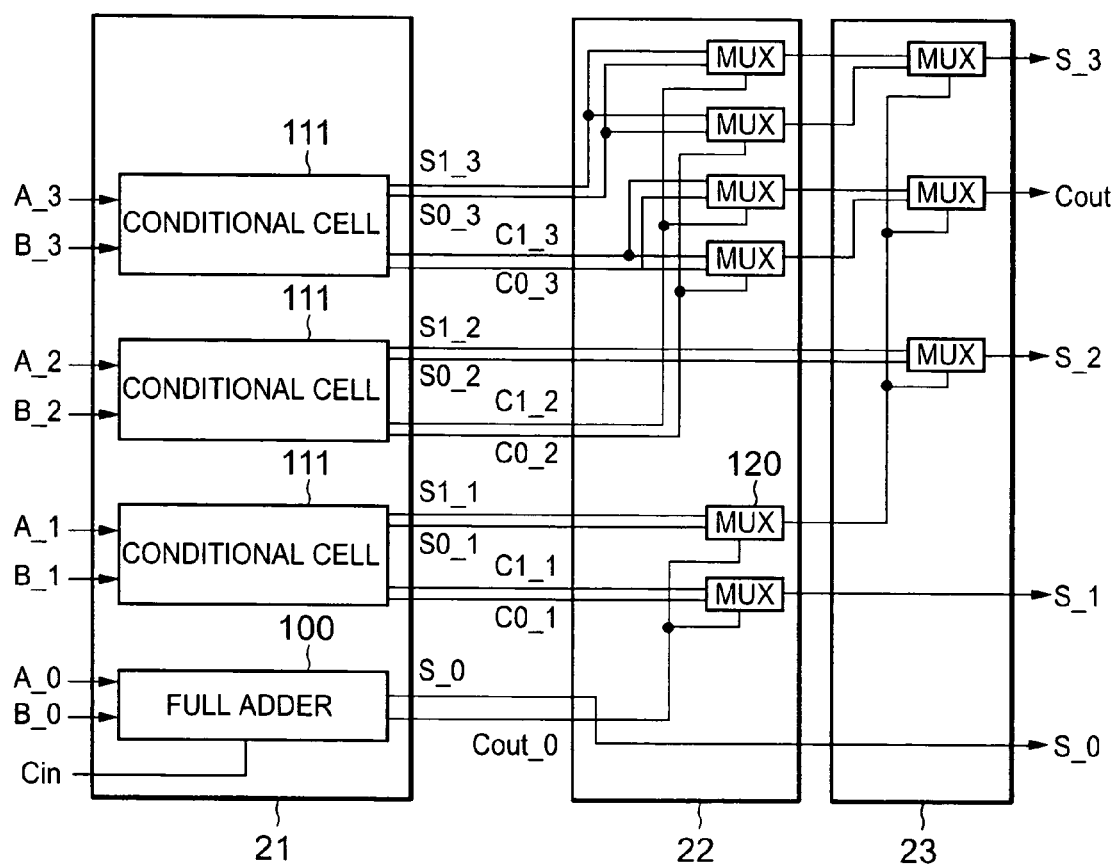
FIG. 1 is a circuit diagram in the case where a conditional sum adder of a first conventional example is applied to a 4-bit adder.

According to the adder of the first conventional example as shown in FIG. 1, the carries and the sums are generated in the first circuit stage and transferred. In addition, according to the adder of the second conventional example as shown in FIG. 2, the carries are transferred to generate the actual carry signals and all actual bit sums are generated in the final circuit stage at once. In contrast to those, according to the adder of the present invention, the provisional carries are converted into the provisional sums in a circuit stage in which the carries are transferred. Accordingly, according to the adder of the present invention, the number of multiplexers and the number of input and output wirings for the multiplexers can be reduced as compared with the adder of the first conventional example in which the carries and the sums are generated for all bits and transferred. Thus, power dissipation can be reduced. In addition, the adder of the present invention can be realized by the number of circuit stages equal to that in the first conventional example (that is, the number of circuit stages smaller than that in the second conventional example by one). Thus, as compared with the adder of the second conventional example, it is possible that adding is executed at high speed.

The number of multiplexers necessary to construct the adder of the first conventional example is compared with the number of multiplexers necessary to construct the adder of the present invention. In the case of the 16-bit adder, although 75 multiplexers are required for the first conventional example, the adder of the present invention can be constructed by circuits corresponding to 71 multiplexers. In the case of the 32-bit adder, although 186 multiplexers are required for the first conventional example, the adder of the present invention can be constructed by circuits corresponding to 175 multiplexers. The case of the 32-bit adder will be itemized in detail. In the present invention, the number of multiplexers is reduced from 186 in the first conventional example to 129. However, because 46 converters in total are added to generate bit sums in a circuit stage. As a result, 11 multiplexers can be omitted. Further, even in the case of each of the conditional cells, although two bit sum signals are required as the provisional sums in the first conventional example, only one exclusive OR signal may be generated in the present invention. Thus, according to the present invention, the number of transistors necessary to construct the conditional cells can be reduced and power dissipation can be reduced in view of this point. Note that, with respect to count of the number of circuits corresponding to the multiplexers, it is assumed that those circuits are composed of pass transistors, the carry selector and the converter each are converted to 2 multiplexers, and the exclusive OR circuit is converted to 1 multiplexer.

Also, the number of circuit stages necessary to construct the adder of the second conventional example is compared with the number of circuit stages necessary to construct the adder of the present invention. In the case where the 16-bit adder is constructed, although 6 circuit stages are required for the adder of the second conventional example, the adder of the present invention can be constructed by 5 circuit stages. In the case of the 32-bit adder, although 7 circuit stages are required for the adder of the second conventional example, the adder of the present invention can be constructed by 6 circuit stages. Thus, the number of logic stages in a critical path of the adder of the present invention can be reduced by one as compared with that of the adder of the second conventional example, and the adder of the present invention can be realized by the number of logic stages equal to that in the adder of the first conventional example. Here, the number of logic stages indicates the sum total of the numbers of conditional cells, multiplexers, carry selectors, converters, and exclusive OR circuits, which are located on a path on which the carries or the sums are transferred from the first circuit stage to the final circuit stage.

Note that, although the embodiment of the present invention is described with reference to the 16-bit adder, the present invention is not limited to the 16-bit adder. According to the present invention, with respect to a $2^N$-bit adder, although effects with respect to reduction in power and an increase in speed are unremarkable in the case of $N \leq 2$, the effects with respect to reduction in power and an increase in speed are produced in the case of $N \geq 3$.

As described above, the adder of the present invention has the same number of circuit stages as in the first conventional example. Thus, there is a remarkable effect that the adder can operate in low power by reducing the number of unit cells such as multiplexers and the number of wirings as compared with the first conventional example while operation at the same speed as in the first conventional example (that is, at higher speed than in the second conventional example) is maintained.

What is claimed is:

1. A high speed adder in which provisional carries composed of a pair of signals that indicate a case where carry is produced from a low order bit and a case where no carry is produced therefrom are generated in advance and an actual carry is selected from the provisional carries in accordance with selection information from the low order bit, the high speed added comprising:
    a carry transfer path; and
    a plurality of converters, each of which converts the provisional carries into provisional sums composed of a pair of signals that indicate the case where the carry is produced from the low order bit and the case where no carry is produced therefrom, the converters being provided on a predetermined portion of the carry transfer path,
    wherein, when the adder is a $2^N$(N is an integer of 3 or more)-bit adder, the carry transfer path comprises (N+1) or less circuit stages,
    wherein a first circuit stage receives two input data for each corresponding bit and an input carry signal from an outside, generates a bit sum of a least significant bit, outputs the bit sum to the outside, generates provisional carries corresponding to each of bits other than the least significant bit, and outputs the generated provisional carries to a following circuit stage,
    wherein second to N-th circuit stages convert the provisional carries corresponding to higher $(2^{(N-1)}-1)$ bits other than a most significant bit, of the provisional carries into the provisional sums by at least one of the converters in course of transfer, and generate actual carries from the provisional carries corresponding to lower $(2^{(N-1)}-1)$ bits other than the least significant bit, and wherein a (N+1)-th circuit stage outputs data other than a bit sum of the least significant bit, of sum data of the two input data and an output carry signal to the outside.

2. An adder according to claim 1, wherein, when the input data is arranged in an order from the most significant bit to the least significant bit, at least one of the converters is located corresponding to a $(2^{(N-M-1)}+1)$-th bit to a $2^{(N-M)}$-th bit from the most significant bit of the input data in a (N−M+1)-th circuit stage which is specified by an integer M that satisfies $1 \leq M<N$.

3. An adder according to claim 1, wherein the first circuit stage comprises:
    $(2^N-1)$ conditional cells, each of which receives corresponding bits of the two input data to perform an exclusive OR operation, generates the provisional carries composed of the pair of signals that indicate the case where the carry is produced from the low order bit and the case where no carry is produced therefrom, and outputs the generated provisional carries, the conditional cells being provided corresponding to a most significant bit of $2^N$ bits to a bit higher than the least significant bit thereof by one; and
    a full adder that receives the least significant bits of the two input data and the output carry signal and generates an exclusive OR signal and a carry signal.

4. An adder according to claim 3, wherein each of the conditional cells comprises:
    a first gate that receives two input bits and performs an AND operation on the two input bits to output a first signal;
    a second gate that receives the two input bits and performs an OR operation on the two input bits to output a second signal;
    a third gate that receives the first signal outputted from the first gate and inverts the received first signal to output a third signal; and
    a fourth gate that receives the second signal outputted from the second gate and to third signal outputted from the third gate and performs the AND operation on the second signal and the third signal to output a fourth signal,
    wherein the first signal outputted from the first gate is given as a first carry signal which is the carry signal in the case where no carry is produced from the low order bit,
    wherein the second signal outputted from the second gate is given as a second carry signal which is the carry signal in the case where the carry is produced from the low order bit, and
    wherein the fourth signal outputted from the fourth gate is a result of the exclusive OR operation performed on the two input bits.

5. An adder according to claim 3, wherein, of the circuit stages, when the (N−M+1)-th circuit stage which is specified by the integer M that satisfies $1 \leq M<N$ is divided in a virtual form into $2^M$ sub-circuits corresponding to every $2^{(N-M)}$ bits of the input data,
    the (N−M+1)-th circuit stage comprises:
    $2^{(N-M-1)}$ multiplexers, each of which receives a pair of signals which are outputs of one of the conditional cell and the carry selector which are provided for a corresponding bit in a preceding circuit stage; receives a signal outputted from one of the full adder and the multiplexer which are provided for a bit in a circuit stage preceding by one stage, and which corresponds to a $(2^{(N-M-1)}+1)$-th bit from a top in a first sub-arithmetic circuit; selects an actual carry signal in accordance with the received signal; and outputs the actual carry signal, the multiplexers being provided corresponding to higher $2^{(N-M-1)}$ bits of the first sub-arithmetic circuit which include an input from a bit corresponding to a $2^{(N-M)}$-th bit from the least significant bit in a high order direction;

$(2^{(N-1)}-2^{(N-M-1)})$ carry selectors, each of which receives a pair of signals which are outputs of one of the conditional cell, the carry selector, and the converter, which are provided for the corresponding bit in the preceding circuit stage; receives a pair of selection signals which are outputs of one of the conditional cell and the carry selector which are provided for a bit in the circuit stage preceding by one stage, and which corresponds to the $(2^{(N-M-1)}+1)$-th bit from the top in a sub-circuit; selects a pair of signals indicating the provisional carries or the provisional sums in the following circuit stage in accordance with the selection signals; and outputs the selected pair of signals, the carry selectors being provided corresponding to the higher $2^{(N-M-1)}$ bits in the sub-circuit which is included in a second sub-arithmetic circuit composed of a sub-circuit that receives a carry signal corresponding to the most significant bit or a third sub-arithmetic circuit composed of second to $(2^M-1)$-th sub-circuits from the second sub-arithmetic circuit in the low order direction; and $2^{(N-M-1)}$ converters, each of which receives a pair of signals which are outputs of one of the conditional cell and the carry selector which are provided for the corresponding bit in the preceding circuit stage and indicate the provisional carries, and an exclusive OR signal outputted from the conditional cell corresponding to a bit higher by one bit in the first circuit stage; converts the received pair of signals into a pair of signals indicating the provisional sums; and outputs the pair of signals indicating the provisional sums, the converters being provided corresponding to lower $2^{(N-M-1)}$ bits in the second sub-arithmetic circuit.

6. An adder according to claim 5, wherein each of the conditional cells comprises:

a first gate that receives two input bits and performs an AND operation on the two input bits to output a first signal;

a second gate that receives the two input bits and performs an OR operation on the two input bits to output a second signal;

a third gate that receives the first signal outputted from the first gate and inverts the received first signal to output a third signal; and a fourth gate that receives the second signal outputted from the second gate and the third signal outputted from the third gate and performs an AND operation on the second signal and the third signal to output a fourth signal, wherein the first signal outputted from the first gate is given as a first carry signal which is the carry signal in the case where no carry is produced from the low order bit, wherein the second signal outputted from the second gate is given as a second carry signal which is the carry signal in the case where the carry is produced from the low order bit, and wherein the fourth signal outputted from the fourth gate is a result of the exclusive OR operation performed on the two input bits.

7. An adder according to claim 5, wherein each of the converters comprises:

a first exclusive OR circuit that receives one of the pair of signals indicating the provisional carries and the exclusive OR signal outputted from the conditional cell corresponding to the bit higher by one bit in the first circuit stage and outputs one of the pair of signals indicating the provisional sums; and a second exclusive OR circuit that receives the other of the pair of signals indicating the provisional carries and the exclusive OR signal, and outputs the other of the pair of signals indicating the provisional sums.

8. An adder according to claim 5, wherein each of the carry selectors comprises:

a first multiplexer that receives a pair of input signals indicating the provisional carries, selects one of the pair of input signals in accordance with one of the pair of selection signals, and outputs the selected one as one of a pair of output signals; and a second multiplexer that receives the pair of input signals, selects one of the pair of input signals in accordance with the other of the pair of selection signals, and outputs the selected one as the other of the pair of output signals.

9. An adder according to claim 5, wherein the (N+1)-th circuit stage comprises:

a multiplexer that receives a pair of signals outputted from a highest order carry selector provided corresponding to the most significant bit of the input data in the N-th circuit stage, selects an output carry signal in accordance with the selection signal outputted the multiplexer corresponding to a $(2^{(N-1)}+1)$-th bit from the most significant bit of the input data in the low order direction in the N-th circuit stage, and outputs the output carry signal;

$(2^{(N-1)}-1)$ multiplexers, each of which receives the pair of signals outputted from one of the carry selector and the converter which are provided for a corresponding bit in the N-th circuit stage, selects a signal corresponding to an actual bit sum of a bit higher by one bit in accordance with the selection signal outputted from the multiplexer corresponding to the $(2^{(N-1)}+1)$-th bit from the most significant bit of the input data in the low order direction in the N-th circuit stage, and outputs the signal corresponding to an actual bit sum of a bit higher by one bit, the multiplexers being provided corresponding to a second bit to a $2^{(N-1)}$-th bit from the most significant bit of the input data in the low order direction; and $2^{(N-1)}$ exclusive OR circuits, each of which receives the actual carry signal outputted from one of the full adder and the multiplexer which are provided for the corresponding bit in a preceding circuit stage and the exclusive OR signal outputted from the conditional cell corresponding to the bit higher by one bit in the first circuit stage, and outputs a signal corresponding to an actual bit sum of a bit higher by one bit, the exclusive OR circuits being provided corresponding to a $(2^{(N-1)}+1)$-th bit to a $2^N$-th bit from the most significant bit of the input data in the low order direction.

10. An adder according to claim 9, wherein each of the conditional cells comprises:

a first gate that receives two input bits and performs an AND operation on the two input bits to output a first signal;

a second gate that receives the two input bits and performs an OR operation on the two input bits to output a second signal;

a third gate that receives the first signal outputted from the first gate and inverts the received first signal to output a third signal; and a fourth gate that receives the second signal outputted from the second gate and the third signal outputted from the third gate and performs the AND operation on the second signal and the third signal to output a fourth signal, wherein the first signal outputted from the first gate is given as a first carry signal which is the carry signal in the case where no carry is produced from the low order bit, wherein the second signal outputted from the second gate is given as a second carry signal which is the carry signal in the case where the carry is produced from the low order bit, and wherein the fourth signal outputted from the fourth gate is a result of the exclusive OR operation on the two input bits.

11. An adder according to claim 9, wherein each of the converters comprises:

a first exclusive OR circuit that receives one of the pair of signals indicating the provisional carries and the exclusive OR signal outputted from the conditional cell corresponding to the bit higher by one bit in the first circuit stage, and outputs one of the pair of signals indicating the provisional sums; and a second exclusive OR circuit that receives the other of the pair of signals indicating the provisional carries and the exclusive OR signal, and outputs the other of the pair of signals indicating the provisional sums.

12. An adder according to claim 9, wherein each of the carry selectors comprises:

a first multiplexer that receives a pair of input signals indicating the provisional carries, selects one of the pair of input signals in accordance with one of the pair of selection signals, and outputs the selected one as one of a pair of output signals; and a second multiplexer that receives the pair of input signals, selects one of the pair of input signals in accordance with the other of the pair of selection signals, and outputs the selected one as the other of the pair of output signals.

13. An adder calculating a sum of numbers A and B, said number A being expressed by at least five binary bits $A_1$, $A_2$, $A_3$, $A_4$, and $A_5$, said $A_2$ being less significant than said $A_1$, said $A_3$ being less significant than said $A_2$, said $A_4$ being less significant than said $A_3$, said $A_5$ being less significant than said $A_4$, said number B being expressed by at least five binary bits $B_1$, $B_2$, $B_3$, $B_4$, and $B_5$, said $B_2$ being less significant than said $B_1$, said $B_3$ being less significant than said $B_2$, said $B_4$ being less significant than said $B_3$, said $B_5$ being less significant than said $B_4$, said adder comprising:

a first conditional cell receiving said binary bits $A_1$ and $B_1$ and outputting a pair of first provisional carries and a first exclusive OR of said binary bits $A_1$ and $B_1$ one of said first provisional carries indicating a carry generated by a sum of said binary bits $A_1$ and $B_1$ providing that a sum of said binary bits $A_2$ and $B_2$ generates a carry, another of said first provisional carries indicating a carry generated by said sum of said binary bits $A_1$ and $B_1$ providing that said sum of said binary bits $A_2$ and $B_2$ generates no carry;

a second conditional cell receiving said binary bits $A_2$ and $B_2$ and outputting a pair of second provisional carries and a second exclusive OR of said binary bits $A_2$ and $B_2$, one of said second provisional carries indicating a carry generated by said sum of said binary bits $A_2$ and $B_2$ providing that a sum of said binary bits $A_3$ and $B_3$ generates a carry, another of said second provisional carries indicating a carry generated by said sum of said binary bits $A_2$ and $B_2$ providing that said sum of said binary bits $A_3$ and $B_3$ generates no carry;

a third conditional cell receiving said binary bits $A_3$ and $B_3$ and outputting a pair of third provisional carries and a third exclusive OR of said binary bits $A_3$ and $B_3$, one of said third provisional carries indicating a carry generated by said sum of said binary bits $A_3$ and $B_3$ providing that a sum of said binary bits $A_4$ and $B_4$ generates a carry, another of said third provisional carries indicating a carry generated by said sum of said binary bits $A_3$ and said $B_3$ providing that said sum of said binary bits $A_4$ and $B_4$ generates no carry;

a fourth conditional cell receiving said binary bits $A_4$ and $B_4$ and outputting a pair of fourth provisional carries and a fourth exclusive OR of said binary bits $A_4$ and $B_4$, one of said fourth provisional carries indicating a carry generated by said sum of said binary bits $A_4$ and $B_4$ providing that a sum of said binary bits $A_5$ and $B_5$ generates a carry, another of said fourth provisional carries indicating a carry generated by sum of said binary bits $A_4$ and $B_4$ providing that said sum of said binary bits $A_5$ and $B_5$ generates no carry;

a first carry selector receiving said pair of first provisional carries and said pair of second provisional carries and outputting a pair of fifth provisional carries, one of said fifth provisional carries indicating a carry generated by said sum of said binary bits $A_1$ and $B_1$ providing that said sum of said binary bits $A_3$ and $B_3$ generates a carry, another of said fifth provisional carries indicating a carry generated by said sum of said binary bits $A_1$ and $B_1$ providing that said sum of said binary bits $A_3$ and $B_3$ generates no carry;

a second carry selector receiving said pair of third provisional carries and said pair of fourth provisional carries and outputting a pair of sixth provisional carries, one of said sixth provisional carries indicating a carry generated by said sum of said binary bits $A_3$ and $B_3$ providing that said sum of said $A_5$ and $B_5$ generates a carry, another of said sixth provisional carries indicating a carry generated by said sum of said binary bits $A_3$ and $B_3$ providing that said sum of said binary bits $A_5$ and $B_5$ generates no carry;

a first converter receiving said first exclusive OR and said pair of second provisional carries and outputting a pair of first provisional sums, one of said first provisional sums indicating said sum of said binary bits $A_1$ and $B_1$ providing that said sum of said binary bits $A_3$ and $B_3$ generates a carry, another of said first provisional sums indicating said sum of said binary bits $A_1$ and $B_1$ providing said sum of said binary bits $A_3$ and $B_3$ generates no carry; and a second converter receiving said second exclusive OR and said pair of said sixth provisional carries and outputting a pair of second provisional sums, one of said second provisional sums indicating said sum of said binary bits $A_2$ and $B_2$ providing that said sum of said binary bits $A_5$ and $B_5$ generates a carry, another of said second provisional sums indicating said sum of said binary bits $A_2$ and $B_2$ providing that said sum of said binary bits $A_5$ and $B_5$ generates no carry.

14. The adder according to claim 13, further comprising:
a third carry selector receiving said first provisional sums and said sixth provisional carries and outputting a pair of third provisional sums, one of said third provisional sums indicating said sum of said binary bits $A_1$ and $B_1$ providing that said sum of said binary bits $A_5$ and $B_5$ generates a carry, another of said third provisional sums indicating said sum of said binary bits $A_1$ and $B_1$ providing that said sum of said binary bits $A_5$ and $B_5$ generates no carry.

15. The adder according to claim 14, further comprising:
a fourth carry selector receiving said pair of fifth provisional carries and said pair of sixth provisional carries and outputting a pair of seventh provisional carries, one of said seventh provisional carries indicating a carry generated by said sum of said binary bits $A_1$ and $B_1$ providing that said sum of said $A_5$ and $B_5$ generates a carry, another of said seventh provisional carries indicating a carry generated by said sum of said binary bits $A_1$ and $B_1$ providing that said sam of said binary bits $A_5$ and $B_5$ generates no carry.

16. An adder calculating a sum of numbers A and B, said number A being expressed by at least four binary bits $A_1$, $A_2$, $A_3$, and $A_4$, said $A_2$ being less significant than said $A_1$, said $A_3$ being less significant than said $A_2$, said $A_4$ being less significant than said $A_3$, said number B being expressed by at least four binary bits $B_1$, $B_2$, $B_3$, and $B_4$, said $B_2$ being less significant than said $B_1$, said $B_3$ being less significant than said $B_2$, said $B_4$ being less significant than said $B_3$, said adder comprising:

a first conditional cell receiving said binary bits $A_1$ and $B_1$ and outputting a pair of first provisional carries and a first exclusive OR of said binary bits $A_1$ and $B_1$, one of said first provisional carries indicating a carry generated by a sum of said binary bits $A_1$ and $B_1$ providing that a sum of said binary bits $A_2$ and $B_2$ generates a carry, another of said first provisional carries indicating a carry generated by said sum of said binary bits $A_1$ and $B_1$ providing that said sum of said binary bits $A_2$ and $B_2$ generates no carry;

a second conditional cell receiving said binary bits $A_2$ and $B_2$ and outputting a pair of second provisional carries and a second exclusive OR of said binary bits $A_2$ and $B_2$, one of said second provisional carries indicating a carry generated by said sum of said binary bits $A_2$ and $B_2$ providing that a sum of said binary bits $A_3$ and $B_3$ generates a carry, another of said second provisional carries indicating a carry generated by said sum of said binary bits $A_2$ and $B_2$ providing that said sum of said binary bits $A_3$ and $B_3$ generates no carry;

a third conditional cell receiving said binary bits $A_3$ and $B_3$ and outputting a pair of third provisional carries and a third exclusive OR of said binary bits $A_3$ and $B_3$, one of said third provisional carries indicating a carry generated by said sum of said binary bits $A_3$ and $B_3$ providing that a sum of said binary bits $A_4$ and $B_4$ generates a carry, another of said third provisional carries indicating a carry generated by said sum of said binary bits $A_3$ and $B_3$ providing that said sum of said binary bits $A_4$ and $B_4$ generates no carry;

a first carry selector receiving said pair of second provisional carries and said pair of third provisional carries and outputting a pair of fourth provisional carries, one of said fourth provisional carries indicating a carry generated by said sum of said binary bits $A_2$ and $B_2$ providing that said sum of said binary bits $A_4$ and $B_4$ generates a carry, another of said fourth provisional carries indicating a carry generated by said sum of said binary bits $A_2$ and $B_2$ providing that said sum of said binary bits $A_4$ and $B_4$ generates no carry; and a first converter receiving said first exclusive OR and said pair of fourth provisional carries and outputting a pair of first provisional sums, one of said first provisional sums indicating said sum of said binary bits $A_1$ and $B_1$ providing that said sum of said binary bits $A_4$ and $B_4$ generates a carry, another of said first provisional sums indicating said sum of said binary bits $A_1$ and $B_1$ providing said sum of said binary bits $A_4$ and $B_4$ generates no carry.

* * * * *